United States Patent [19]

Kumagai et al.

[11] Patent Number: 5,414,666
[45] Date of Patent: May 9, 1995

[54] MEMORY CONTROL DEVICE

[75] Inventors: Ryohei Kumagai; Weikang Yang, both of Tokyo, Japan

[73] Assignee: Ezel Inc., Tokyo, Japan

[21] Appl. No.: 921,110

[22] Filed: Jul. 30, 1992

[30] Foreign Application Priority Data

Jul. 31, 1991 [JP] Japan .................................. 3-214805

[51] Int. Cl.⁶ .............................................. G11C 7/00
[52] U.S. Cl. ................................ 365/222; 365/230.05;
365/233; 365/238.5; 395/725
[58] Field of Search .................... 365/222, 230.05, 233, 365/238.5; 395/725

[56] References Cited

U.S. PATENT DOCUMENTS

| | | | |
|---|---|---|---|
| 4,493,036 | 1/1985 | Bondreau et al. | 395/725 |
| 4,796,232 | 1/1989 | House | 365/222 |
| 4,956,820 | 9/1990 | Hashimoto | 365/222 |
| 5,216,635 | 6/1993 | Kass et al. | 365/222 |

FOREIGN PATENT DOCUMENTS

| | | |
|---|---|---|
| 0322065 | 12/1988 | France. |
| 2202978 | 2/1988 | United Kingdom. |

OTHER PUBLICATIONS

N. Siddique, 100 MHz DRAM Controller Sparks Multi-Processor Design, Electronic Design, vol. 34, No. 22, Sep. 1986 pp. 138–141.

Reiner et al., "VLSI Development of a Global Memory Interfaced Controller", 1990 Military Commnications Conference, Oct. 3, 1990, p. 254.

D. Bursky, 'Triple-port DRAM fuels graphics displays', Electronic Design, vol. 35, No. 10, Apr. 1987, pp. 53–54.

"To Control an Image Memory in Various Way", Ryohei Kumagai, 7, vol. 2, No. 7 With English Translat ion.

*Primary Examiner*—Joseph A. Popek
*Attorney, Agent, or Firm*—Cushman, Darby & Cushman

[57] ABSTRACT

A memory control device adaptable to various demands and using a standard DRAM. A memory interface for outputting an address of the memory and controllably reading and writing is connected to the memory. A plurality of input and output ports are connected to the memory interface through a local bus. A host interface is connected to the memory interface through the local bus. A refresh control refreshes the memory through the memory interface. An arbitration structure arbitrates the required access to memory between the refresh control means, the input and output ports and the host interface.

22 Claims, 8 Drawing Sheets

MEMORY CONTROL DEVICE

FIELD OF THE INVENTION

The present invention relates to a memory control device whose standard DRAM can be used as various special memories.

BACKGROUND OF THE INVENTION

Recent years have seen many various kinds of demands placed on memory IC chips. There have been demands for a memory IC to have a multiport capability, various ways of accessing and scanning, and requirements for high memory capacity and high speed processing. To meet these demands, a memory and another element to work as a memory and can access dual-port memory, field memory, orthogonal memory or the memory or a Region of Interest ("ROI") have been provided or proposed in the following references:

(1) "Exclusive DRAM Placing Emphasis on User's Demand", Nikkei Electronics, May 2, 1988.

(2) "Exclusive DRAM is the Big Trend Involving in Standard Product", Nikkei Electronics, Jun. 12, 1989.

(3) Mori, et al. "Image Memory for Graphics Using Rectangle Area Access", The Journal of the Institute of Electronics, Information and communication Engineers, March, 1989.

(The titles above are translations.)

As such, each memory serving a special demand has a simple function. A memory IC with multiple functions does not exist. Such a memory is expensive as compared with the standard DRAM.

SUMMARY OF THE INVENTION

The present invention solves the above problems of the prior art by providing a memory control device that can be adapted to various demands using a standard DRAM.

The memory control device according to the present invention performs: i) controlling an address of a memory, also controlling reading from and writing in the memory through a memory interface, ii) data is given and received to and from outside, respectively, by the memory through a memory interface, iii) accessing a memory at random and accessing a memory directly through a host interface, iv) controlling various actions with respect to the memory control device, and v) accessing the memory at high speed through a plural number of input and output ports.

It is possible to use a standard DRAM as a special memory of a multiport memory or another special memory, and easy to control.

BRIEF DESCRIPTION OF THE DRAWINGS

These and other objects, features and characteristics of the present invention, as well as the method of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

PREFERRED EMBODIMENT OF THE PRESENT INVENTION

Hereinafter, an embodiment of the memory control device according to the present invention is described with reference to the attached drawings.

Figure 1:
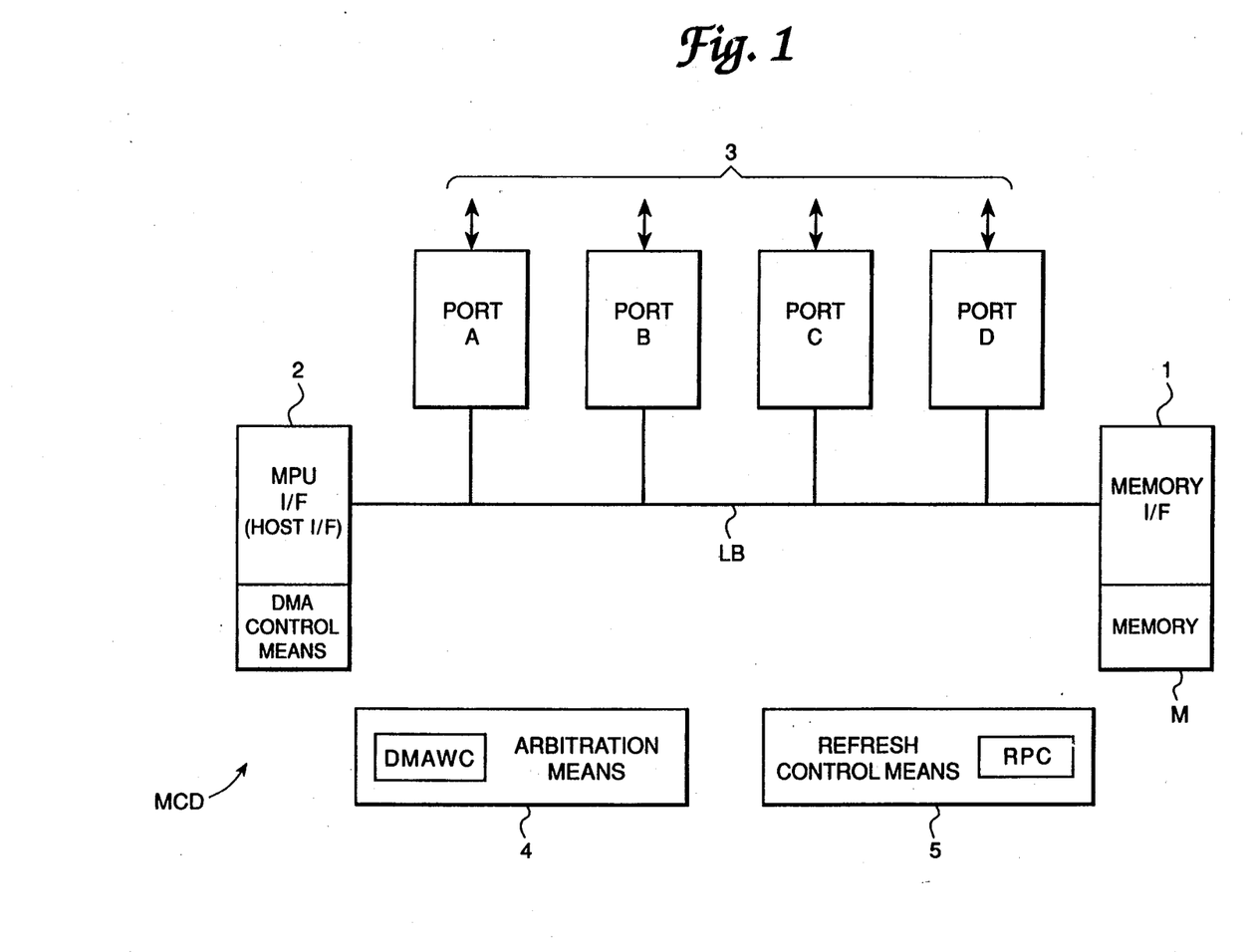
FIG. 1 shows a block diagram of an embodiment of a memory control device according to the present invention.
Figure 2:
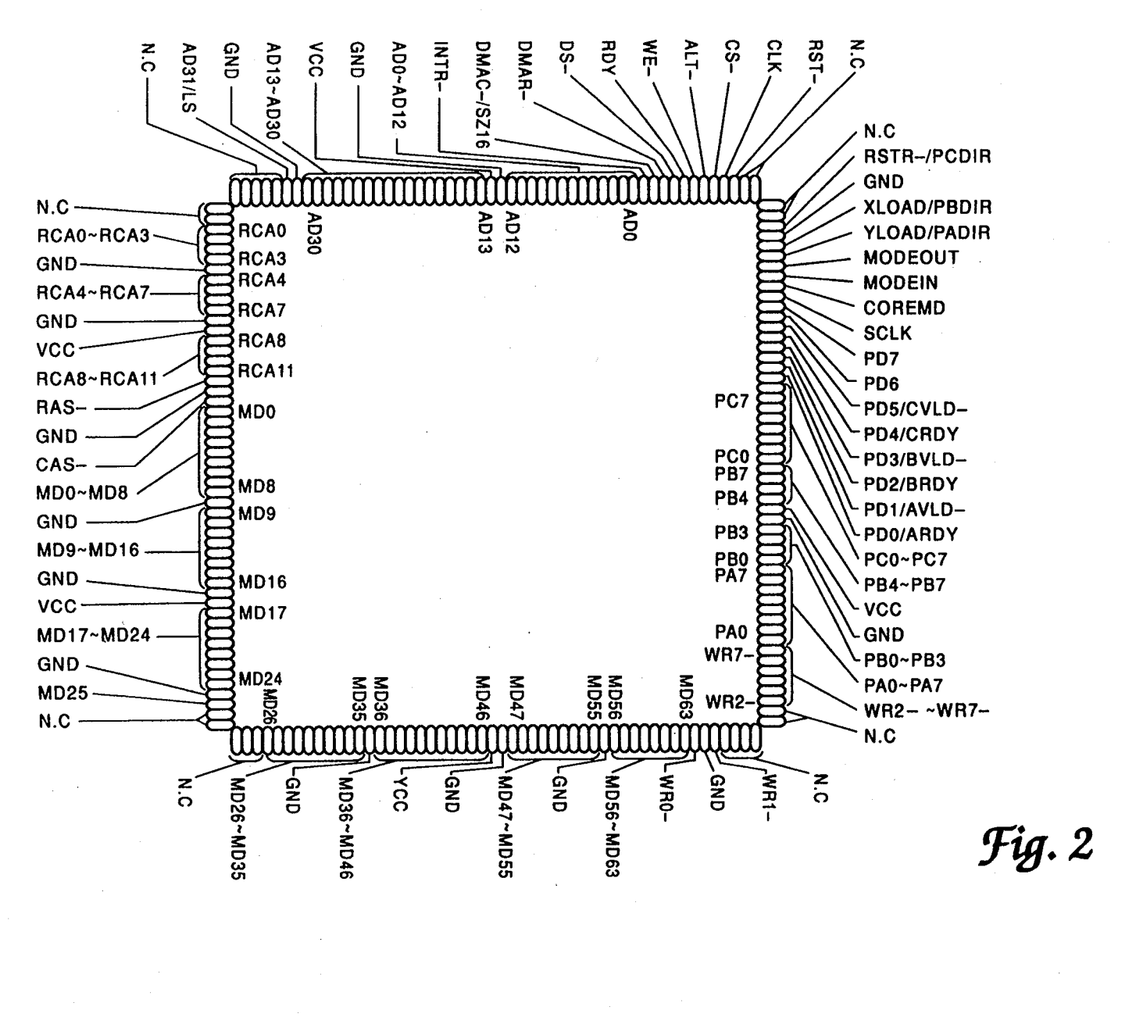
FIG. 2 shows a plan view of the pin assignment of IC of the embodiment.

FIG. 1 shows a block diagram of a memory control device MCD which comprises memory interface 1 connected to memory M and host interface 2 connected to an MPU host through system bus. The two interfaces are connected by local bus LB. FIG. 2 shows the pin assignment of the MCD as implemented in LSI. In FIG. 2, the codes with hyphens in the end show that they are signals of low priority, and the numerals at the end of the codes are arranged so as to increase in the counterclockwise direction. The first and last data codes of each data group are shown inside the device to better depict the arrangement.

By connecting a plural number of the input and output ports 3 to the local bus, data is timely sent and received to, or from, outside a memory interface.

The memory access is mediated between host interface 2, the input/output ports 3 and the memory refresh in the refresh control means 5 by arbitration means 4, which is connected to the DMA control means, host interface 2, input/output ports 3, memory interface 1 and the refresh control means 5. The arbitration considers the priority of the interfaces and ports, and the interface or port with the first or highest priority is allowed to access or refresh memory.

There are four modes in which the host interface can operate when accessing memory: random access mode, page access mode, direct memory access with MCD master and direct memory access with MCD slave. The selection of mode is set beforehand in an internal register of the MCD (not shown).

Various internal registers are set in order to set a function and to store data of the MCD. The address of memory M is additionally stored in the internal register of MCD (not shown).

Figure 3:
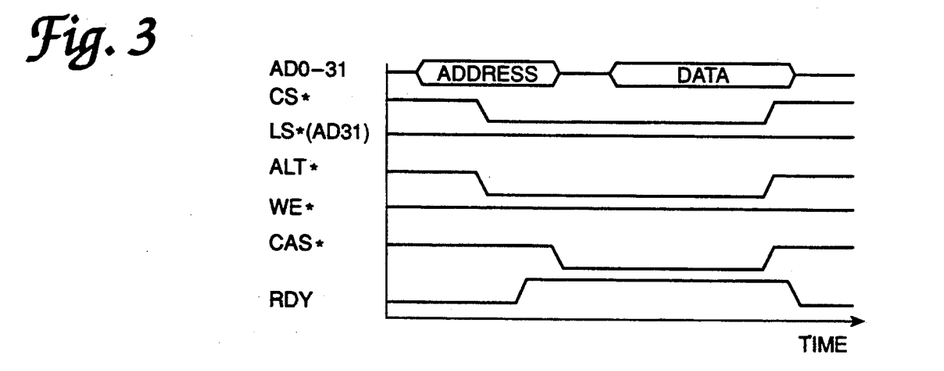
FIG. 3 is a timing chart to show reading in an inner register of the embodiment.
Figure 4:
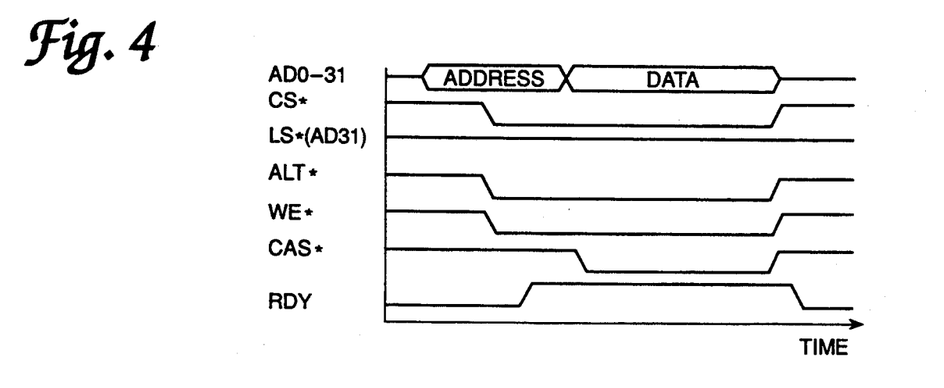
FIG. 4 is a timing chart to show writing in an inner register of the embodiment.

For access to the internal register, pins from AD0 to AD31 and LT- are used. As shown in FIGS. 3 and 4, pins from AD0 to AD31 are used for both internal addresses and data. When ALT- is placed at a low level, an address is latched and data can be input and output. Reading and writing is designated by WE- (write enable), which is classified as low priority.

Pins from AD4 to AD9 are assigned for internal register addresses, and AD4 to AD29 are assigned for addresses of memory M. As the address to be designated here is a word address, the memory space MCD can control $2^{26} \times 2$ bytes, that is, $2^{27}$ bytes. The internal register and DRAM are selected by AD31, which is the most significant bit of the data.

Figure 5:
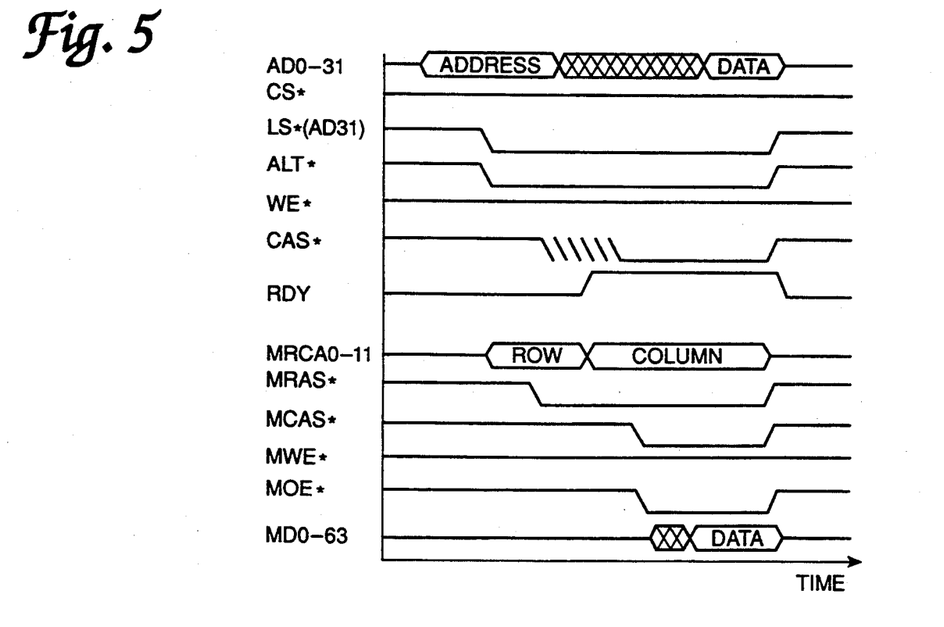
FIG. 5 is a timing chart to show the cycle of reading memory when memory is accessed at random from the host using the embodiment.
Figure 6:
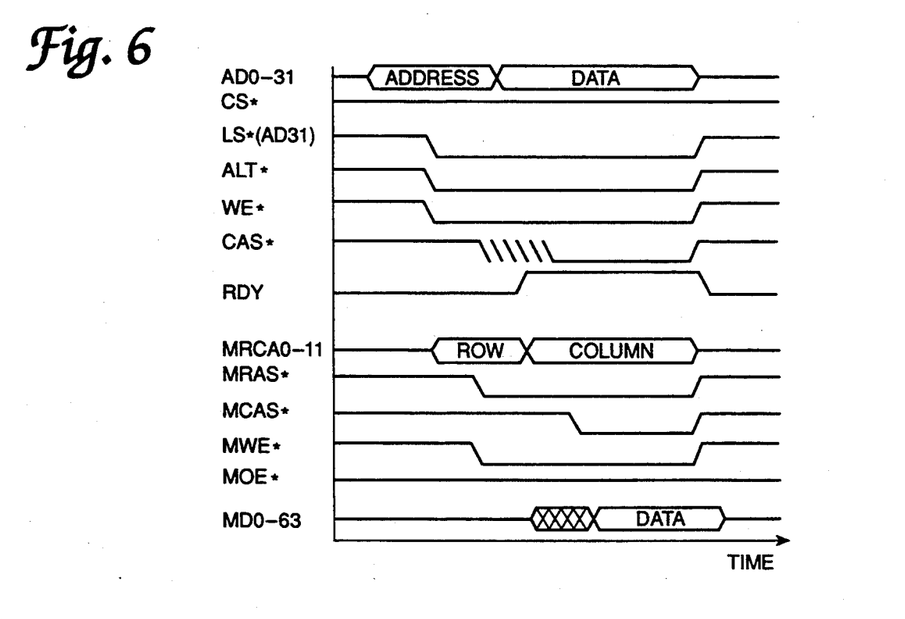
FIG. 6 is a timing chart to show the cycle of writing in a memory when memory is accessed in random from the host using the embodiment.

In random access mode, the address of memory M is designated from outside, with data being read and written by 16 bits or 32 bits. After the length of data in the internal register is set, data is read and written by a predetermined cycle. FIGS. 5 and 6 show the read cycle and write cycle of the DRAM. When the address is requested to be designated by the host, MCD samples the request of internal memory access and so forth and sets RDY at low level, thereby allowing the request of memory access to the host. After that, MCD designates the row address of DRAM (12 bits) and column address (12 bits) for the memory using the 12 bit signal from MRCA0 TO MRCA11. Address buses from AD4 to AD29 have 26 bits, by which a word address of a memory is designated. The address is designated as 27 bits in total.

Figure 7:
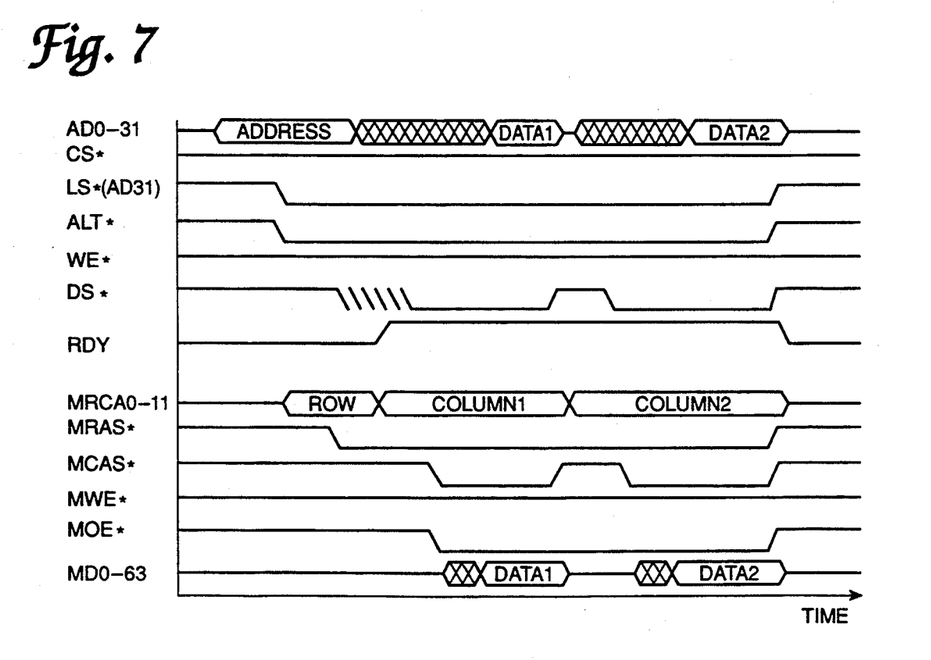
FIG. 7 is a timing chart to show a cycle of reading memory when page mode access is executed on the memory for the host using the embodiment.
Figure 8:
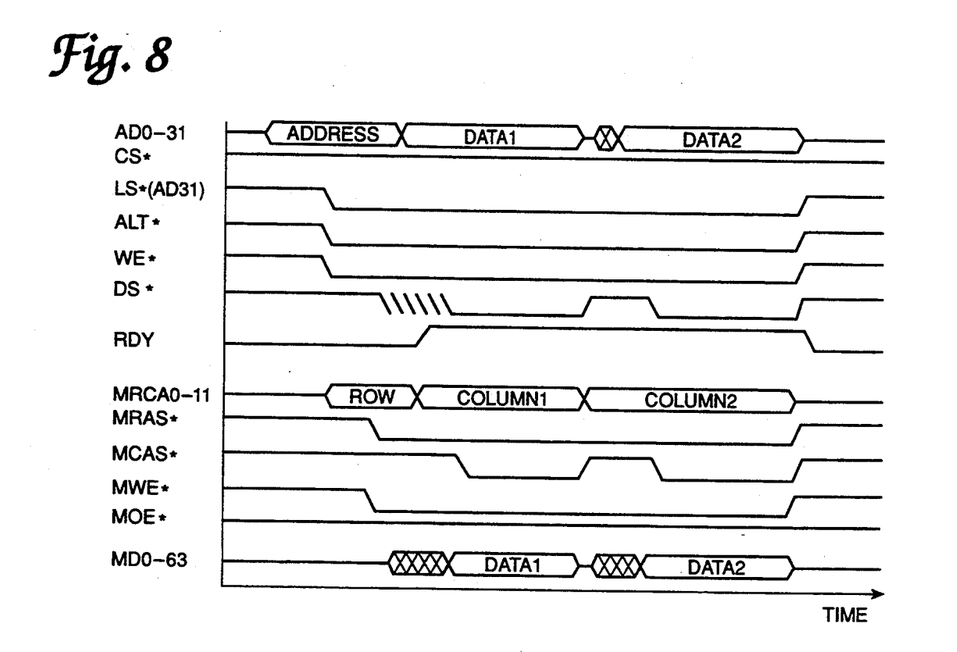
FIG. 8 is a timing chart to show cycle of writing in a memory when page mode access is executed on the memory from the host using the embodiment.

In page access mode, only a start address is designated from outside, and the column address is increased automatically by the control of the DS signal from outside. The page mode of DRAM can be advantageous to use as it can be executed at high speed. FIGS. 7 and 8 show the reading and writing cycle during page access mode. A column address is increased by first setting a DS value at a high level, and lowering it to a low level after a column address is generated. As ALT- is low level when the first address latch is completed, DS is changed seeing ALT-.

Figure 9:
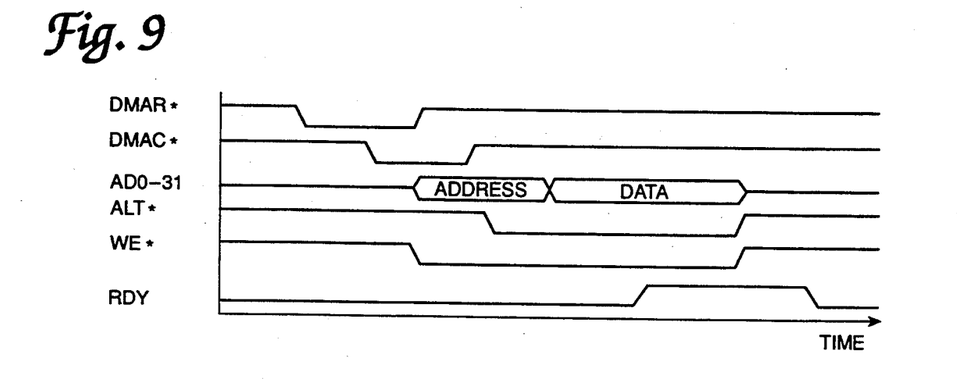
FIG. 9 is a timing chart of direct memory access with master mode using the embodiment.

On direct memory access with MCD master, permission must first be obtained from the MCD before data is transmitted. Before executing the DMA, the MCD outputs the signal DMAR-. When system bus arbitration logic accepts it (DMAC- is low level), the MCD is placed in control. FIG. 9 shows a timing chart in the case of direct memory access with MCD master.

In a writing mode with direct memory access with MCD slave, the writing address corresponding to memory M is sequentially renewed from a starting address by writing data from the outside onto a DMA data register of the MCD. On the other hand, while in reading mode, the IMC renews an address automatically from a starting address, inputs the data of the memory into a DMA mode data register, and outputs it sequentially.

Figure 10:
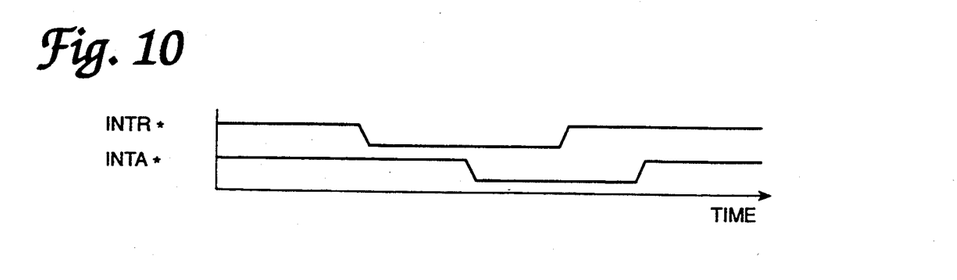
FIG. 10 is a timing chart to show the interruption for the host using the embodiment.

With respect to the DMA mode above, it is possible to access the memory of the Region of Interest (ROI). It is possible to read and write from or to a rectangular memory area using the start address as a corner and by registering the number of pixels of a necessary area, the number of rasters and offset (the number of pixels from the last raster pixels to the start pixel of the next raster) in the internal registers beforehand. For either of the above direct memory access modes, memory access is established initially at a low priority. A weight counter DMAWC is increased every time the access request is not accepted in a predetermined amount of time. Subsequently, the DMA modes are given higher priority according to the counted value of DMAWC, and the count is reset when the memory access request is accepted. MCD shows the completion of DMA transmission and the completion of transmission in the input and output port described later by setting interruption signal INTR- at a low level as shown in FIG. 10. The port which has completed transmission is shown in status register of the inner register.

MCD also includes refresh control means 5 (shown in FIG. 1) for controlling refresh of the DRAM memory M, which refreshes memory M as necessary but still allows sufficient memory access. Refresh pending counter RPC is included in refresh rate control means 5 for controlling the refresh rate. The count of the counter RPC is increased when refresh is required and also if it is not accepted. The priority of the refresh is increased according to the indication of the counted number in counter RPC. When refresh is accepted, the number is decreased.

The aforementioned input and output port 3 includes a set of 4 ports labelled from A to D. A, B and C give and receive data to or from the outside by a two-way data bus, and work independently. Port C is used as an input-only port during an image processing mode described below, or as an input port of control signals for ports A, B and C.

These ports support three kinds of data transmission including a handshake mode, a synchronous mode and an image processing mode. The role of each port in each of the three modes is set beforehand in an image processing mode (described later).

In these transmissions, the MCD can simultaneously perform expansion, contraction, reverse the direction of scanning for reading and execute a change of data between non-interlace and interlace. The transmission mode and other functions are recorded in the internal register.

Figure 11:
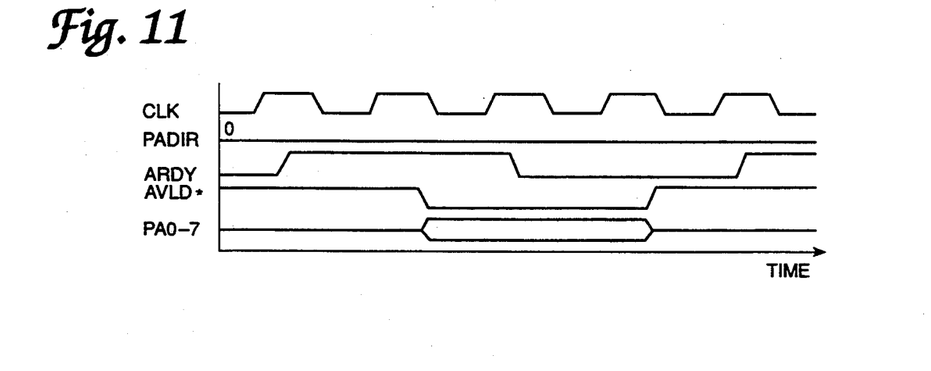
FIG. 11 is a timing chart to show the output by handshaking of input and output ports in the embodiment.
Figure 12:
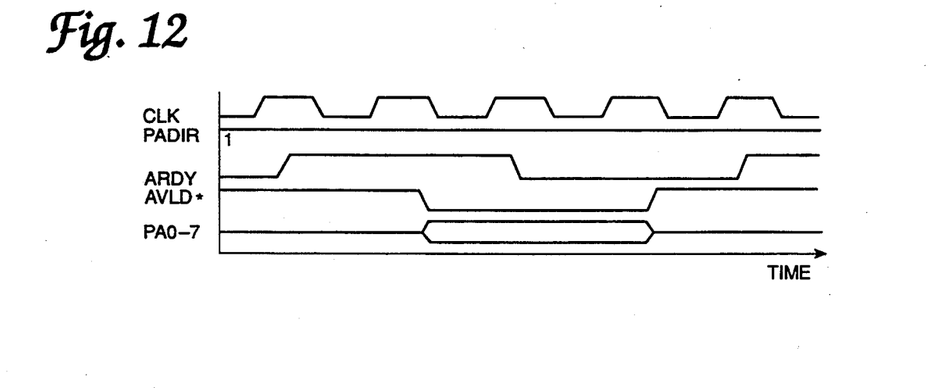
FIG. 12 is a timing chart to show the output by handshake of input and output ports in the embodiment.

FIGS. 11 and 12 show timing charts of output and input of the handshake mode. The ARDY signal and AVLD- signal are used for handshaking. If the ARDY signal is placed in a high level from outside, MCD outputs data from PA0 to PA7 as soon as the data is prepared to be output. Simultaneously it makes the AVLD- signal a low level. The AVLD- signal represents the efficiency of data. When the ARDY signal is a high level, it is possible to input data. When data is input from outside and the AVLD- signal is at a low level, the data is latched. Here in the figures, the signal name (pin assignment) of port A is representatively shown: the other ports are respectively labelled, substituting the signals B, C and D for A.

Figure 13:
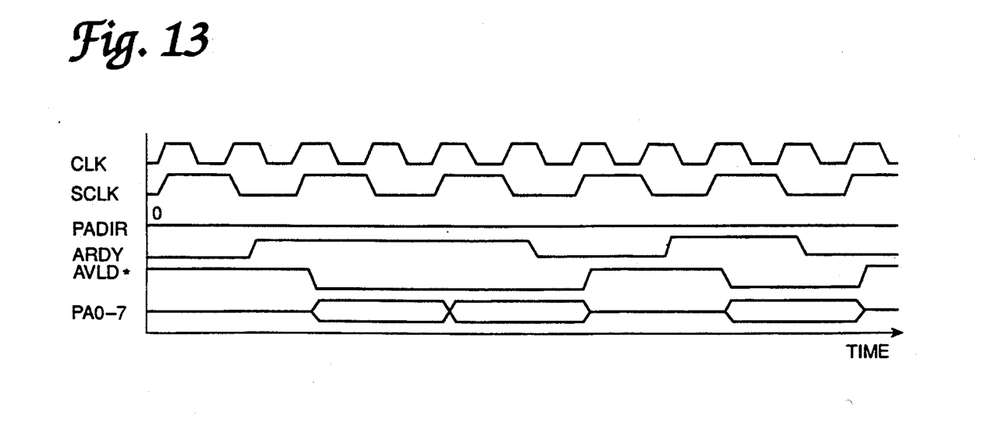
FIG. 13 is a timing chart to show the synchronous output of the input and output ports in the embodiment.
Figure 14:
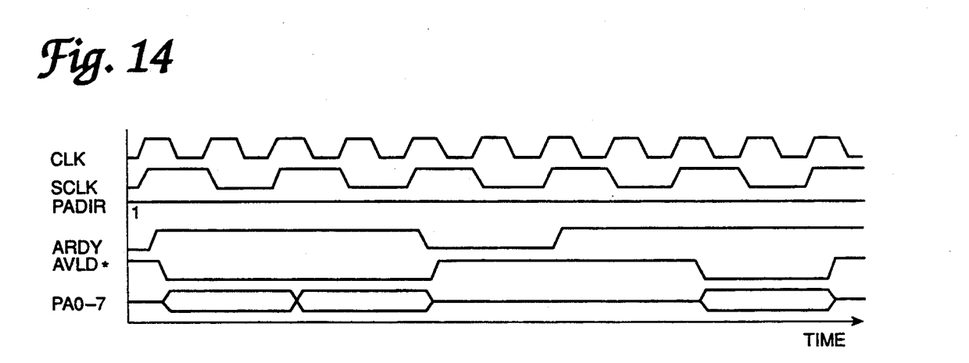

FIGS. 13 and 14 show timing charts of input and output in synchronous mode. Data is input and output synchronously with SCLK. When ARDY signal is placed in a high level from outside, MCD outputs data from PA0 to PA7 as soon as the data is prepared. Simultaneously, it places the AVLD-signal at a low level. AVLD- signal shows the efficiency of data here, too. When ARDY signal is at a high level, data can be input. When data is input from outside and the AVLD- signal is at a low level while the ARDY signal is a high level, the data is latched.

Figure 15:
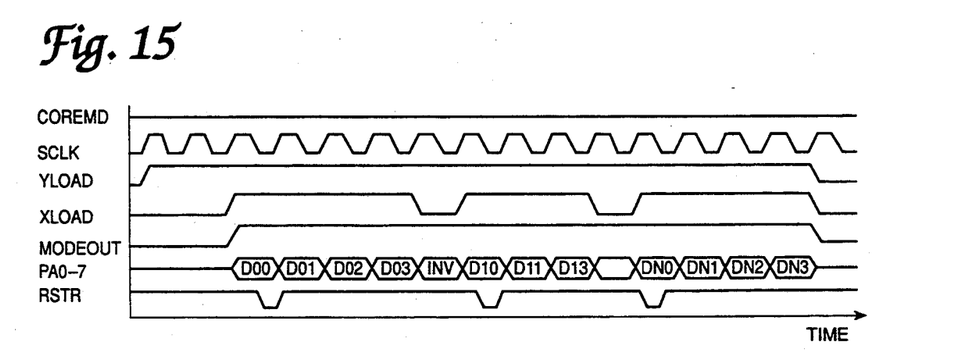
FIG. 15 is a timing chart to show the sequential data output in image processing mode of input and output ports in the embodiment.
Figure 16:
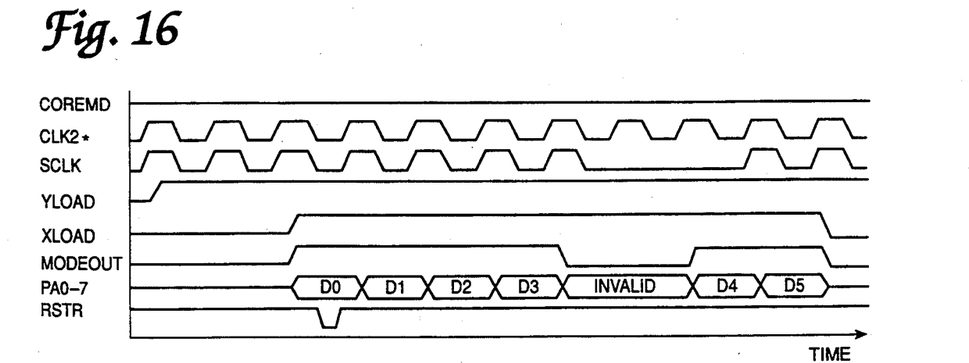
FIG. 16 is a timing chart to show the intermittent data output in image processing mode of input and output in the embodiment.

In image processing mode, ports from A to C are used for output ports and port D is used for an input port. YLOAD is used for the starting signal of the first plane (the signal corresponding to the vertical blanking of the indication system), XLOAD is used for the starting signal of the first raster (corresponds to the horizontal blanking of the indication system), MODEOUT is used for the pipeline control signal of an image processing system. They are shown in FIGS. 15 and 16. The data to be processed is input from a memory and sent to an image processing system from ports A, B and C. The result through the image processing system is input to port D and stored in a memory. Signal MODEIN shows the effectiveness and ineffectiveness of output data of the image processing system, which can be input to MCD. Signal RSTR- is a timing signal for sequentially processing the image processing system, which refresh the line memory for storing the previous raster before starting raster scan. This refreshment is executed with a little delay from the rising of XLOAD. FIG. 15 shows an example where the transmission of an image of one plane is executed sequentially. FIG. 16 shows an example where the data transmission is interrupted by making MODEOUT a low level for refreshing memory M.

Figure 17:
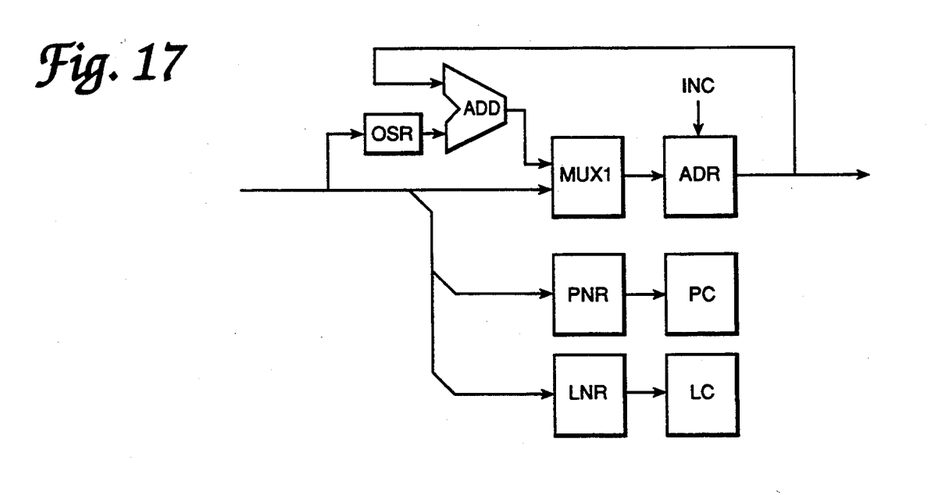
FIG. 17 shows a block diagram of an address generation means of an input and output means in the embodiment.

The capability of the aforementioned input/output ports and host interface in generating a memory address is provided by an address generation means contained within these components. This address generation means is depicted in FIG. 17. It comprises a start address register ADR for generating an address for a memory, a line number register LNR for storing the number of rasters in the vertical direction of the area to be accessed, pixel number register PNR for registering the number of pixels in the horizontal direction of the same area, and offset register OSR for registering the change of the coordinates with respect to horizontal direction on the movement of location for access from one raster to be next raster. PNR is connected to pixel counter PC. PC loads the PNR data just before accessing a raster, and decreases the counted number every time it accesses data corresponding to a pixel. Line number register LNR is connected to line counter LC. LC loads the data of LNR just before accessing a defined rectangular area of the memory, and decreases the counted number every time it completes one raster of access. It is possible to designate the end points of a raster and the area of the rectangular area above by these steps.

In forward scanning, when an access to a memory is started, a start address is registered in a address register ADR. The address number is then increased by inputting a increment signal INC which sequentially selects addresses following the start address in an incremental manner. The memory address needed to make access is calculated according to the data of line counter LC and pixel counter PC. The address value is output from MRCA0 to MRCA11 after it is given to address register ADR. The coordinates in the vertical direction of an image are increased every time one raster is completed. The coordinates in the horizontal direction of an image are increased by one raster, but when the coordinates come to the end point, the first horizontal address of the next raster is determined by the addition of the value of the address register ADR and offset register OSR. This means for adding is performed by an adder ADD. Executing it, the start address of the next raster can be generated at high speed.

Adder ADD is commonly used as the address generation means of each port, allowing circuits connected to the LMCD to efficiently access the memory M.

Figure 19:
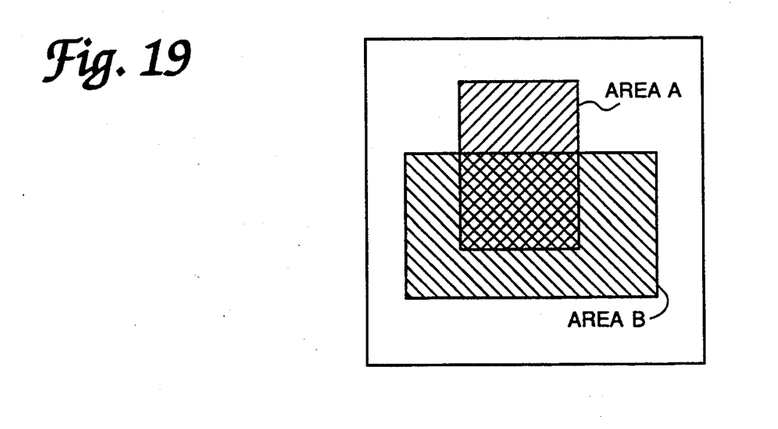
FIG. 19 shows a state for memory access by the embodiment.

As the address generation means functions independently for every port, an address can be set independent of other addresses. When the input and output of some ports are defined in memory, the function of a multiport memory can be obtained. For example as shown in FIG. 19, the area of a memory A and B can be accessed by both ports A and B.

Reverse direction scanning is executed by inputting a decrement signal instead of an increment signal INC, reversing the order of address generation by sequentially selecting addresses preceding the start address.

During transmission to and from memory M, data can be expanded in the horizontal direction and/or vertical direction. To expand in the horizontal direction, one pixel is repeatedly read and written. Similarly, to expand in the vertical direction, one raster of data is repeatedly read and/or written.

Contraction of data can also be performed by reading or writing only a partial amount of the data designated by the address generation means. For contraction in the horizontal direction, pixels are read out on an intermittent basis. In the vertical direction, rasters are read out on an intermittent basis.

Transformation of data from interlace to non-interlace is performed by combining two successive image fields making up an image frame. This is accomplished by alternately reading rasters from one image field and then the other, then outputting the rasters as a non-interlaced image. Transformation of non-interlaced data to interlaced data is accomplished by dividing an image frame into even and odd rasters. These two raster groups are then formed into two separate image fields, which together, contain the image data.

Figure 18:
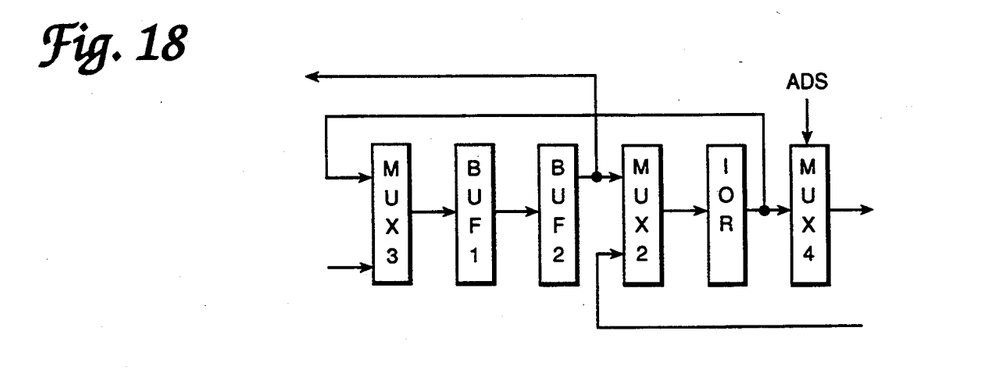
FIG. 18 shows a block diagram of an input and output buffer B of an input and output port of the embodiment.

Input and output buffer B is set in each port in order to input and output memory data to and from input and output port 3 as shown in FIG. 18. Buffer B comprises the first buffer BUF1 which is connected to input side of memory interface and the second buffer which is settled by following BUF1. Buffer BUF1 is a buffer with 64 bits for storing data of 64 bits output from a memory. When 64 bits data is input to BUF1, the data is immediately transmitted to BUF2. Consequently, reading of 128 bits is sequentially executed, which means it is possible to input data at high speed. Input and output register IOR is connected on output side of buffer BUF2 through multiplexer MUX2. MUX2 input data is coupled to a port or alternatively it outputs data to BUF2.

When output of a memory is output from a port, MUX2 inputs the output of BUF2 to the input/output register IOR, which functions as a third buffer. IOR outputs 64 bits of data by 8 bits in parallel, and inputs them to multiplexer MUX4. Address signal ADS is already input to MUX4. MUX4, functioning as a byte selection means, either selects all 8 bits of data from one line of the IOR or selects only 1 bit from the 8 bits of data. The selected data is then output from a port. In this way, the data of a memory can be output to a port 1 bit at a time. The input to a port is input to multiplexer MUX2. Then the input is transmitted to a memory, where MUX2 selects the outputs of MUX4 and inputs them to the input/output register IOR. The data of IOR is transmitted to a memory from BUF2 through MUX3 to BUF1. The data of BUF1 is immediately transmitted to BUF2, allowing memory to be written by 128 bits. Therefore, it is possible to input data at high speed.

The memory control device according to the present invention therefore performs: i) controlling an address of a memory, along with the reading from and writing to the memory through a memory interface, ii) data is given and received to and from outside, respectively, by the memory through the memory interface, iii) randomly accessing a memory and accessing a memory directly through host interface, iv) controlling various actions with respect to the memory control device, and v) accessing the memory at high speed through a plural number of input and output ports. Therefore, a standard DRAM can be used for a multiport memory and other special memory, in a way which is easy to control.

What is claimed is:

1. A memory control device for controlling a dynamic memory that has a local bus, comprising:
   a memory interface, connected to said memory and to at least one external device, for controlling access to said memory so that all communication with said memory is provided through said memory interface;
   a plurality of input and output ports coupled to said memory through said memory interface and the local bus;
   refresh control means coupled to said memory through said memory interface for refreshing said memory;
   arbitration means, connected to said memory interface, said input and output ports and said refresh control means, for arbitrating memory access requests from said refresh control means and said input and output ports on the basis of an access priority; and
   means for adjusting the access priority of said refresh control means.

2. A memory control device as in claim 1, further comprising a host interface coupled to said memory through said memory interface and said local bus, wherein said arbitration means arbitrates memory access requests from said host interface, said refresh control means and any of said input and output ports.

3. A memory control device as claimed in claim 2, wherein the input and output ports and host interface comprise:
   a start address register for registering a starting address for access to said memory;
   means for storing a size of an area of said memory to be accessed, a location of said area defined by said starting address;
   an offset register for registering an offset of a column address used when moving from a low address access to a subsequent lower address access;
   means for adding said offset to the column address on completing said access of a low address in said area of said memory.

4. A memory control device as claimed in claim 3, wherein said adding means for an input and output port is comprised of one input and output port common to all the input and output ports.

5. A device as in claim 2 wherein said host interface transforms image data from an interlace mode to a non-interlace mode by reading alternate rasters.

6. A memory control device as in claim 2, wherein said host interface operates in one of a random access mode, a page access mode, a direct memory access mode with the control device functioning in a master status, and a direct memory access mode with the control device functioning in a slave status.

7. A device as in claim 2, wherein said host interface controls operation in a random access mode in which an address of the memory is received through one of said input and output ports.

8. A memory control device as in claim 2, wherein said host interface controls operation in a page access mode in which a start address is received and incremented until a column end is reached, where a column number is automatically increased.

9. A memory control device as in claim 2, wherein said host interface further comprises address generation means, including:
   a line number register for storing a number of rasters in a vertical direction of an area to be addressed;
   a pixel number register for storing a number of pixels in an horizontal direction of said area to be addressed; and
   an offset register for storing a change of coordinates in the horizontal direction.

10. A device as in claim 9, wherein said offset register resets said change of coordinates stored in said offset register each time one raster is accessed.

11. A memory control device as claimed in claim 1, wherein each said input and output port includes input and output buffer means for temporarily storing input and output data.

12. A memory control device as claimed in claim 11, wherein said input and output buffer means comprise:
   a first buffer for storing data output from said memory;
   a second buffer for storing data to input to said memory;
   a third buffer for storing input and output data; and
   switching means for connecting an output of said first buffer to an input of said second buffer, and connecting an output of said second buffer to an input of said third buffer for connecting an output of said third buffer to one of said input and output port and an output from the second buffer.

13. A memory control device as claimed in claim 12, wherein said third buffer includes:
   a plurality of registers for storing bit strings of 1 byte; and
   byte selection means connected to an output of the third buffer for selecting one of said registers.

14. A memory control device as claimed in claim 13, wherein said bit selection means is set for selectively outputting 1 bit from one of said plurality of registers.

15. A memory control device as in claim 1 wherein one of said input and output ports is solely for control signals.

16. A memory control device as in claim 1, wherein said memory interface compresses data stored in said memory which comprises an comprising an image by controlling a reading of said memory so that only a partial amount of said data comprising said image will be read from said memory.

17. A device as in claim 16 wherein said contraction is carried out in a horizontal direction by intermittently reading pixels.

18. A device as in claim 16 wherein said contraction is carried out in a vertical direction by intermittently reading rasters.

19. A memory control device as in claim 1, wherein said access priority controlling means includes a refresh counter for counting the number of times said memory needs refreshing and the number of times that a memory access request from said refresh control means is not accepted by said arbitration means, with an access priority of said refresh control means being based on a count in said counter.

20. A memory control device as in claim 1, wherein said memory interface expands data stored in said memory which comprises an image by controlling a reading of said memory so that a partial amount of said data comprising said image will be repeatedly read from said memory.

21. A memory control device as in claim 20, wherein said memory interface controls a reading of said memory so as a pixel or raster is read multiple times when data is expanded.

22. A memory control device for controlling a dynamic memory comprising:

a memory interface for connecting said memory to external devices, thereby controlling access to said memory;

a plurality of input and output ports coupled to said memory through said memory interface and a local bus;

refresh control means coupled to said memory through said memory interface for refreshing said memory;

arbitration means, connected to said memory interface, input and output ports and refresh control means, for arbitrating memory access requests from said refresh control means and said plurality of input and output ports on the basis of an access priority; and a refresh counter for controllably adjusting the access priority of said refresh control means by counting the number of times said memory needs refreshing and the number of times that a memory access request from said refresh control means is not accepted by said arbitration means, with an access priority of said refresh control means being based on a count in said counter.

* * * * *

UNITED STATES PATENT AND TRADEMARK OFFICE
CERTIFICATE OF CORRECTION

PATENT NO. : 5,414,666

DATED : May 9, 1995

INVENTOR(S) : KUMAGAI et al.

It is certified that error appears in the above-identified patent and that said Letters Patent is hereby corrected as shown below:

ON THE COVER PAGE:
Reads:

[73]    Assignee:    Ezel Inc., Tokyo, Japan Should Read:

[73]    Assignee:    Ezel Inc., Tokyo, Japan;
                                    Sharp Corporation, Osaka, Japan Signed and Sealed this Twenty-sixth Day of September, 1995

Attest:

BRUCE LEHMAN

Attesting Officer                      Commissioner of Patents and Trademarks